United States Patent
Nedorezov et al.

(10) Patent No.: US 9,810,273 B2
(45) Date of Patent: Nov. 7, 2017

(54) METHODS AND SYSTEM FOR APPLYING A DRIVELINE DISCONNECT CLUTCH

(71) Applicant: Ford Global Technologies, LLC, Dearborn, MI (US)

(72) Inventors: Felix Nedorezov, Rochester Hills, MI (US); Francis Thomas Connolly, Ann Arbor, MI (US); Xiaoyong Wang, Novi, MI (US); Hong Jiang, Birmingham, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 14/447,177

(22) Filed: Jul. 30, 2014

(65) Prior Publication Data

US 2016/0032990 A1    Feb. 4, 2016

(51) Int. Cl.
| | | |
|---|---|---|
| *B60W 20/00* | (2016.01) | |
| *B60W 10/02* | (2006.01) | |
| *F16D 48/06* | (2006.01) | |
| *B60W 20/40* | (2016.01) | |
| *F02N 11/08* | (2006.01) | |
| *B60W 30/00* | (2006.01) | |

(52) U.S. Cl.
CPC ........... *F16D 48/066* (2013.01); *B60W 20/40* (2013.01); *B60W 30/00* (2013.01); *B60W 2510/083* (2013.01); *B60W 2510/087* (2013.01); *B60W 2540/106* (2013.01); *B60W 2710/023* (2013.01); *F02N 11/0822* (2013.01); *F02N 11/0825* (2013.01); *F02N 11/0833* (2013.01); *F02N 2200/061* (2013.01); *F16D 2500/1107* (2013.01); *F16D 2500/3026* (2013.01); *F16D 2500/3065* (2013.01); *F16D 2500/3067* (2013.01); *F16D 2500/3069* (2013.01); *F16D 2500/31446* (2013.01); *F16D 2500/70406* (2013.01)

(58) Field of Classification Search
None
See application file for complete search history.

(56) References Cited

U.S. PATENT DOCUMENTS

| | | | | |
|---|---|---|---|---|
| 2007/0227791 A1* | 10/2007 | Ueno | ............. | B60K 6/387 |
| | | | | 180/65.245 |
| 2008/0182722 A1* | 7/2008 | Colvin | ............. | B60K 6/48 |
| | | | | 477/180 |
| 2011/0118915 A1* | 5/2011 | Ortmann | ............. | B60K 6/48 |
| | | | | 701/22 |
| 2013/0296125 A1 | 11/2013 | Gibson et al. | | |

(Continued)

OTHER PUBLICATIONS

Anonymous, "Dual Clutch Powershift Life Analysis Process," IPCOM No. 000143581, Published Nov. 29, 2006, 3 pages.

*Primary Examiner* — Robert A Siconolfi
*Assistant Examiner* — Ryan Dodd
(74) *Attorney, Agent, or Firm* — David Kelley; McCoy Russell LLP

(57) ABSTRACT

Systems and methods for improving operation of a driveline disconnect clutch for a hybrid vehicle shifting are presented. In one example, pressure of a working fluid supplied to the driveline disconnect clutch is adjusted in response to a rate of change in accelerator pedal position. Further, pressure of the working fluid may be decreased responsive to selected operating conditions.

11 Claims, 4 Drawing Sheets

(56) References Cited

U.S. PATENT DOCUMENTS

| | | | |
|---|---|---|---|
| 2013/0297122 A1 | 11/2013 | Gibson et al. | |
| 2014/0046529 A1* | 2/2014 | Gibson | F02N 11/00 701/22 |
| 2014/0278018 A1* | 9/2014 | Gibson | F02D 41/022 701/112 |
| 2015/0239467 A1* | 8/2015 | Wang | B60K 6/48 477/5 |

* cited by examiner

METHODS AND SYSTEM FOR APPLYING A DRIVELINE DISCONNECT CLUTCH

FIELD

The present description relates to methods and a system for applying a driveline disconnect clutch of a hybrid vehicle. The system and methods may be useful for hybrid vehicles that include an electric motor or generator that may be selectively coupled to an engine.

BACKGROUND AND SUMMARY

A driveline disconnect clutch may be used to selectively couple and decouple components of a vehicle driveline. The driveline disconnect clutch may be placed between two different torque sources to allow the torque sources to operate independently or together based on vehicle operating conditions. In one example system, a driveline disconnect clutch is placed in a driveline at a location between an engine and an electric machine. The electric machine may be directly mechanically coupled to a transmission. The driveline disconnect clutch may be partially closed to allow the electric machine to crank the engine during engine starting. The engine may be started in response to a driver demand torque or based on other conditions not related to driver demand torque. However, if the engine is not started in a timely manner in response to driver demand torque, the driver may be disappointed with the vehicle's performance.

The inventors herein have recognized the above-mentioned disadvantages and have developed a driveline method, comprising: increasing driveline disconnect clutch working fluid pressure in response to a rate of change in accelerator pedal position.

By increasing and/or adjusting pressure of a working fluid supplied to a driveline disconnect clutch in response to a rate of change in accelerator pedal position, it may be possible to provide the technical result of improving vehicle launch performance while providing acceptable driveline noise, vibration, and harshness (NVH). In particular, a driveline disconnect clutch may be closed at a faster rate via increasing pressure of the working fluid supplied to the driveline disconnect clutch during conditions where the rate of increase in accelerator pedal position indicates an urgency to provide torque to vehicle wheels. On the other hand, if the rate of accelerator pedal position change is low, the pressure of working fluid supplied to the driveline disconnect clutch may be reduced to provide a smoother engine start with lower NVH.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
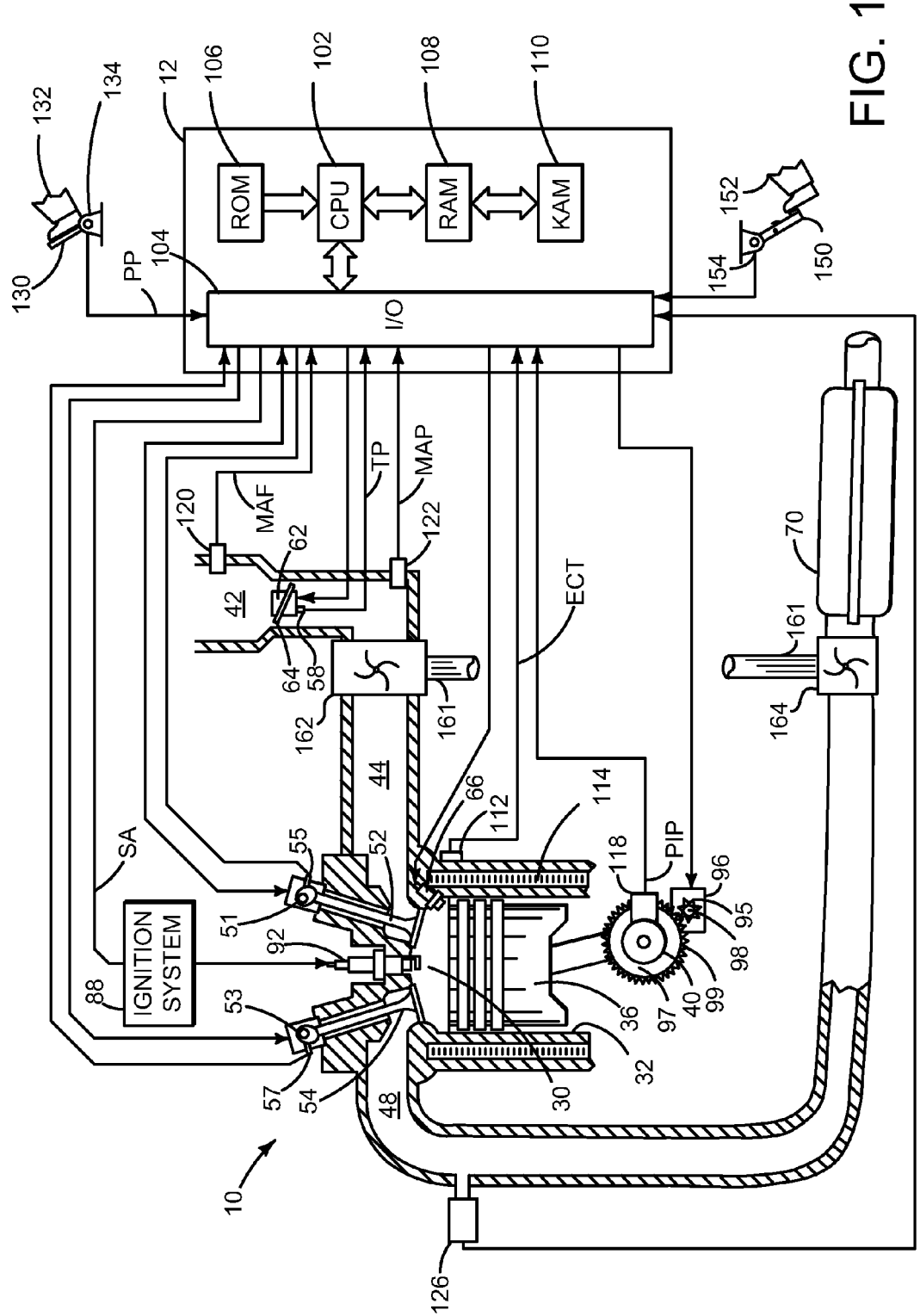
FIG. 1 is a schematic diagram of an engine.
Figure 2:
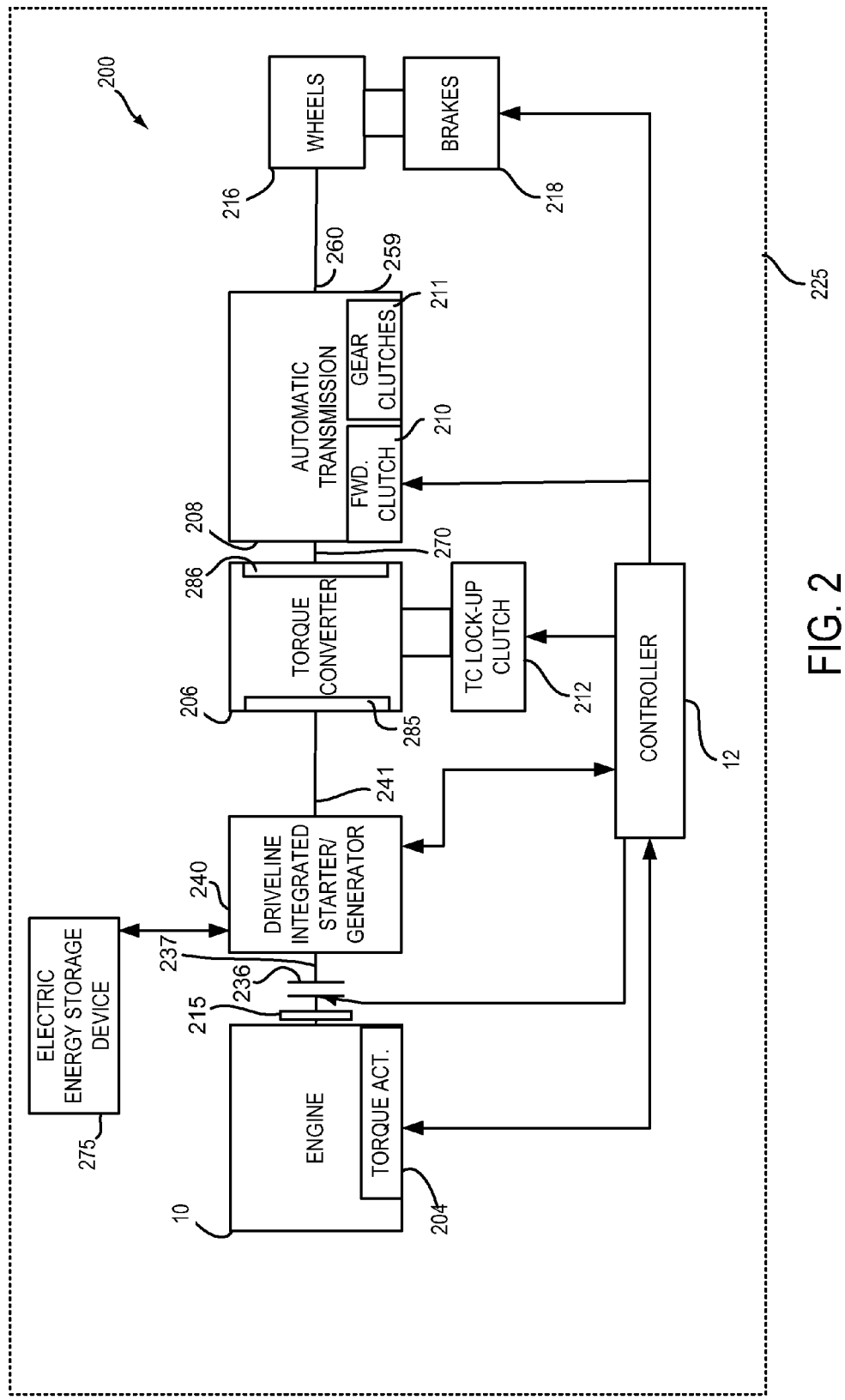
FIG. 2 shows an example vehicle driveline configuration.

The present description is related to improving closing of a driveline disconnect clutch. The driveline disconnect clutch may be closed to start an engine of a hybrid vehicle. FIG. 1 shows one example engine that may be started via closing a driveline disconnect clutch. The engine and driveline disconnect clutch may be incorporated into a driveline of a hybrid vehicle as is shown in FIG. 2. The driveline disconnect clutch may be closed according to the operating sequence shown in FIG. 3. The driveline disconnect clutch may be operated according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 and resuming cylinder combustion.

Thus, the system of FIGS. 1 and 2 provides for a driveline system, comprising: an engine; an electric machine; a driveline disconnect clutch selectively coupling the engine and the electric machine; and a controller including executable instructions stored in non-transitory memory for adjusting a pressure of a working fluid supplied to the driveline disconnect clutch based on an engine cranking torque and a rate of change in accelerator pedal position. The driveline system further comprises adjusting the pressure of the working fluid in response to available DISG torque. The driveline system further comprises adjusting the pressure of the working fluid in response to barometric pressure. The driveline system further comprises adjusting the pressure of the working fluid in response to engine friction. The driveline system further comprises additional instructions to decrease the pressure of the working fluid in response to a number of engine combustion events since engine stop. The driveline system further comprises additional instructions to decrease the pressure of the working fluid in response to engine speed exceeding a threshold speed.

Figure 3:
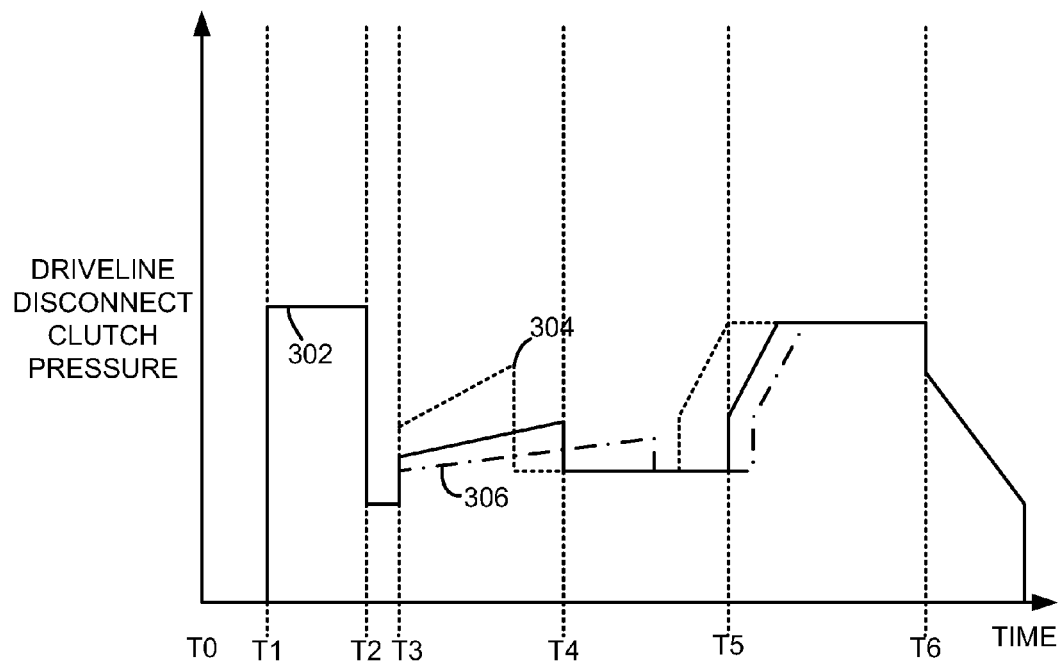
FIG. 3 shows example driveline disconnect clutch working fluid application profiles for engine starting.

Referring now to FIG. 3, three different driveline disconnect clutch working fluid application profiles are shown. The driveline disconnect clutch working fluid application profiles may be applied when starting an engine from a stopped state. The driveline disconnect clutch working fluid profiles 302, 304, and 306 are the same when only profile 302 is visible. The driveline disconnect clutch working fluid profiles may be commanded and applied in the system of FIGS. 1 and 2 according to the method of FIG. 4.

Horizontal lines T0-T6 represent times of particular interest in the sequence. Driveline disconnect clutch working fluid profile 302 represents driveline disconnect clutch working fluid pressure during clutch closing while an engine is being started when driver demand torque is a medium level. Driveline disconnect clutch working fluid profile 304 represents driveline disconnect clutch working fluid pressure during clutch closing while an engine is being started when driver demand torque is a higher level as compared to profile 302. Driveline disconnect clutch working fluid profile 306 represents driveline disconnect clutch working fluid pressure during clutch closing while an engine is being started when driver demand torque is a lower level as compared to profile 302. Each of profiles 302-306 represent driveline disconnect clutch pressure during engine starting for similar conditions except for different rates of increasing driver demand torque and indicated from accelerator pedal position.

The plot's Y axis represents driveline disconnect clutch working fluid (e.g. oil) pressure. Working fluid pressure increases in the direction of the Y axis arrow. The plot's X axis represents time and time increases from the left side of FIG. 3 to the right side of FIG. 3.

At time T0, the driveline disconnect working fluid pressure is low to indicate that the driveline disconnect clutch is not applied and is open. The driveline disconnect clutch does not transfer torque when it is in an open state.

At time T1, the driveline disconnect clutch pressure for profiles 302-306 is increased to fill the driveline disconnect clutch. The driveline disconnect clutch may include a small volume that is filled by initially increasing driveline disconnect clutch pressure. In one example, the pressure increase and duration of pressure increase from time T1 to time T2, is based on driveline disconnect clutch temperature and/or driveline disconnect working fluid temperature. Further, the pressure increase and the duration of the pressure increase (e.g., from time T1 to time T2) may be empirically determined and stored in controller memory to be indexed via driveline disconnect clutch temperature and/or driveline disconnect working fluid temperature. The driveline disconnect clutch pressure shown between time T1 and time T2 may be described as the fill pressure.

At time T2, the driveline disconnect clutch pressure is reduced to stroke the driveline disconnect clutch to a position where driveline disconnect clutch friction element touch without transferring torque across the driveline disconnect clutch. The driveline disconnect clutch pressure shown between time T2 and time T3 may be described as the stroke pressure.

At time T3, the driveline disconnect working fluid pressure is increased in each of traces 302-306. The driveline disconnect working fluid pressure is increased to an initial start of closing pressure. The initial start of closing pressure is based on a minimum engine cranking torque (e.g., torque to rotate the engine at a predetermined speed), engine stopping position, barometric pressure, engine coolant temperature, rate accelerator pedal increase, accelerator pedal position, Available DISG torque, and engine friction. Available DISG torque is DISG torque output capacity (e.g., maximum DISG torque at the present DISG speed and temperature) minus present DISG output torque. In one example, the initial start of closing pressure is based on a model that includes the same parameters. In another example, the minimum engine cranking torque is empirically determined and stored to a table of function in memory. The output of the table or function is operated on by a multiplier or adder that is adjusted based on engine stopping position, barometric pressure, rate of accelerator pedal increase, accelerator pedal position, engine coolant temperature, Available DISG torque, and engine friction. The resulting engine cranking torque is converted into a driveline disconnect clutch working pressure that is output at time T3.

Profile trace 304 at time T3 represents driveline disconnect clutch working fluid pressure during an engine start where accelerator pedal position is increasing at a high rate and accelerator pedal position is at a relatively high value. Therefore, trace 304 increases driveline working fluid pressure to a higher pressure than profile traces 302 and 306. By increasing the driveline disconnect clutch working fluid pressure to a higher level, it may be possible to start the engine sooner to provide torque to the driveline at the expense of additional driveline noise, vibration, or harshness (NVH). The engine may be started sooner because the engine may reach cranking speed sooner as a result of less clutch slippage.

Profile trace 302 at time T3 represents driveline disconnect clutch working fluid pressure during an engine start where accelerator pedal position is increasing at a medium rate and accelerator pedal position is at a relatively middle value. Therefore, trace 302 increases driveline working fluid pressure to a pressure lower than profile trace 304 and higher than profile trace 306. By increasing the driveline disconnect clutch working fluid pressure to a middle level, it may be possible to start the engine while providing lower levels of driveline NVH.

Profile trace 306 at time T3 represents driveline disconnect clutch working fluid pressure during an engine start where accelerator pedal position is not increasing and where the accelerator pedal position is not applied. Therefore, trace 304 increases driveline working fluid pressure to a pressure lower than profile traces 302 and 306. By increasing the driveline disconnect clutch working fluid pressure to a lower level, it may be possible to start the engine with still lower noticeable driveline NVH.

Between time T3 and time T4, driveline disconnect clutch pressure profiles 302-306 are ramped up or increased at a rate that is based on available DISG torque, accelerator pedal rate of increase, and accelerator pedal position. Since the accelerator pedal rate of increase is greater for trace 304 than for traces 302 and 306, the ramp rate of driveline disconnect clutch pressure is greater for trace 304 as compared to traces 302 and 306. Since the accelerator pedal rate of increase is greater for trace 302 than trace 306, the ramp rate of driveline disconnect clutch pressure is greater for trace 302 as compared to trace 306.

At time T4, the driveline disconnect clutch working fluid pressure for trace 302 is reduced. The driveline disconnect clutch working fluid pressure for trace 304 is reduced before the pressure for trace 302 is reduced. The driveline disconnect clutch working fluid pressure for trace 306 is reduced after the pressure for trace 302 is reduced. In one example, the driveline disconnect clutch working fluid pressure may be reduced in response to engine speed exceeding a threshold speed. In another example, the driveline disconnect clutch working fluid pressure may be reduced in response to a number of engine combustion events since engine stop. In still another example, the driveline disconnect clutch working fluid pressure may be reduce in response to a time since driveline disconnect clutch working pressure was ramped up at time T3. Thus, when the engine is accelerated faster to cranking speed, it may be possible for engine speed to run up to synchronous speed sooner.

The driveline disconnect clutch working fluid pressure is reduced at time T4 for driveline disconnect clutch working fluid pressure trace 302 to allow the engine to accelerate to a synchronous speed with the DISG. Therefore, the driveline disconnect clutch may slip as the engine accelerates to a speed synchronous (e.g., same speed) with the DISG.

At time T5, the driveline disconnect clutch working fluid pressure for trace 302 is increased. The driveline disconnect clutch working fluid pressure for trace 304 is increased before the pressure for trace 302 is increased. The driveline disconnect clutch working fluid pressure for trace 306 is increased after the pressure for trace 302 is increased. In one example, the driveline disconnect clutch working fluid pressure may be increased in response to engine speed reaching a same speed as the DISG.

The driveline disconnect clutch working fluid pressure is increased at time T5 for driveline disconnect clutch working fluid pressure trace 302 to allow the engine to provide torque to driveline and vehicle wheels. Consequently, the engine and the DISG may supply torque to the driveline after the driveline disconnect clutch is locked. The driveline disconnect clutch is locked when the driveline disconnect clutch input speed is a same speed as the driveline disconnect clutch output speed.

At time T6, the driveline disconnect clutch working fluid pressures for traces 302-306 are reduced to open the driveline disconnect clutch. The driveline disconnect clutch working fluid pressure may be reduced in response to vehicle operating conditions when it may be desirable to stop engine operation. For example, the engine may be stopped when the vehicle is stopped.

Thus, it may be observed that driveline disconnect clutch working fluid pressures may be adjusted during engine starting in response to a variety of conditions. By adjusting driveline disconnect clutch working fluid pressure in this way, it may be possible to reduce the time it takes to supply engine power to the driveline after the engine has been stopped. Further, driveline NVH may be adjusted based on the urgency of requested torque such that higher NVH levels may be permitted when requested torque is more urgent. Similarly, lower NVH levels may be permitted when requested torque is less urgent. The level of requested torque urgency may be based on rate of increase of accelerator pedal position.

Figure 4:
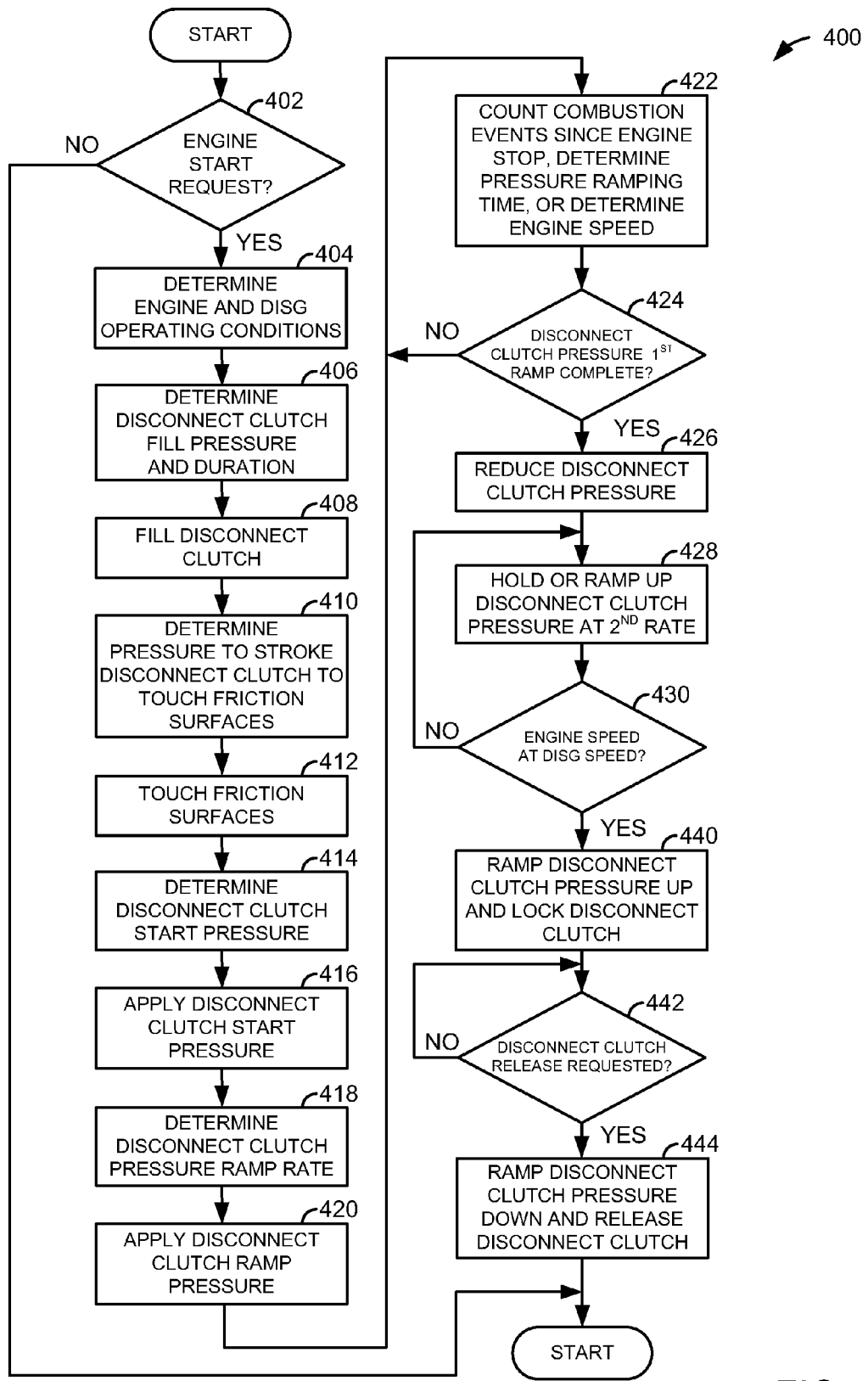
FIG. 4 shows an example method for closing a driveline disconnect clutch in response to vehicle operating conditions.

Referring now to FIG. 4, a method for applying a driveline disconnect clutch is shown. The Method of FIG. 4 may provide the driveline disconnect clutch pressures shown in sequence of FIG. 3. Additionally, the method of FIG. 4 may be incorporated into the system of FIGS. 1 and 2 as executable instructions stored in non-transitory memory.

At 402, method 400 judges if an engine start is requested. An engine start may be initiated in response to battery state of charge (SOC), driver demand torque, catalyst conditions, or other operating conditions. If method 400 judges that an engine start is requested, the answer is yes and method 400 proceeds to 404. Otherwise, the answer is no and method 400 proceeds to exit.

At 404, method 400 determines engine, DISG, and vehicle operating conditions. Operating conditions may include but are not limited to battery SOC, driver demand torque, engine temperature, ambient temperature, catalyst temperature, and vehicle speed. Method 400 proceeds to 406 after operating conditions are determined.

At 406, method 400 determines a driveline disconnect clutch fill pressure and duration (e.g., driveline disconnect clutch working fluid pressure at time T1 of FIG. 3). In one example, the pressure increase and duration of fill pressure increase is based on driveline disconnect clutch temperature and/or driveline disconnect working fluid temperature. Further, the pressure increase and the duration of the pressure increase (e.g., from time T1 to time T2) may be empirically determined and stored in controller memory to be indexed via driveline disconnect clutch temperature and/or driveline disconnect working fluid temperature. Method 400 proceeds to 408 after the driveline disconnect clutch pressure is determined.

At 408, the driveline disconnect clutch is filled with working fluid to the pressure determined at 406. The driveline disconnect clutch may be filled via opening and/or modulating a position of a solenoid valve. For systems where the driveline disconnect clutch is electrically engaged, an offset voltage or current may be substituted for the driveline disconnect clutch pressure. Method 400 proceeds to 410 after the driveline disconnect clutch fill pressure is increased to the fill pressure.

At 410, method 400 determines a stroke pressure. The stroke pressure is pressure that positions the driveline disconnect clutch friction elements to touch each other without transferring torque across the driveline disconnect clutch. The stroke pressure may be empirically determined and stored to a table or function indexed by working fluid temperature. Method 400 proceeds to 412 after the stroke pressure is determined.

At 412, method 400 applies the stroke pressure to the driveline disconnect clutch. The stroke pressure may be lower than the fill pressure. In one example, the stroke pressure is applied to the driveline disconnect clutch via the working fluid for a predetermined amount of time. The stroke pressure may be applied by modulating a solenoid valve supplying working fluid to the driveline disconnect clutch. Method 400 proceeds to 414 after the stroke pressure is applied to the driveline disconnect clutch.

At 414, method 400 determines the driveline disconnect clutch start of closing pressure (e.g., driveline disconnect clutch pressure at time T3 of FIG. 3). The start of closing pressure is based on a minimum engine cranking torque, which is adjusted for barometric pressure, engine temperature, engine friction, Available DISG torque, and engine stopping position. The start of closing pressure increases as Available DISG torque decreases. Further, the start of closing pressure may be increased in response to one or more of engine temperature decreasing, engine friction increasing, and as barometric pressure increasing. In one example, the engine cranking torque is empirically determined and stored to a table or function that is indexed based on barometric pressure, engine friction, and engine temperature. The engine cranking torque is divided by a driveline disconnect gain and added to the stroke pressure to determine the start of closing pressure. Further, the start of closing pressure may be adjusted based on available DISG torque by adding an offset to the start of closing pressure, the offset based on the available DISG current. Method 400 proceeds to 416 after the start of disconnect clutch closing pressure is determined.

At 416, method 400 applies the driveline disconnect clutch start of closing pressure to the driveline disconnect clutch. The start of closing pressure is greater than the stroke pressure. The start of closing pressure is applied to the driveline disconnect clutch via increasing working fluid pressure. The start of closing pressure may be applied by modulating a solenoid valve supplying working fluid to the driveline disconnect clutch. Method 400 proceeds to 418 after the start of closing pressure is applied to the driveline disconnect clutch.

At 418, method 400 determines a driveline disconnect clutch closing pressure ramp rate (e.g., pressure between time T3 and time T4 of FIG. 3). In one example, the driveline disconnect clutch closing pressure ramp rate is empirically determined and may be adjusted based on one or more of accelerator pedal position, accelerator pedal position rate of change, and available DISG torque. The disconnect clutch closing ramp rate may be stored in a table or function in memory. The memory may be indexed via accelerator pedal position, accelerator pedal position rate of change, and available DISG torque. Alternatively, accelerator pedal position, accelerator pedal position rate of change, and available DISG torque may modify the disconnect clutch closing pressure ramp rate via an adder or multiplier. The driveline disconnect clutch ramp rate may be increased in response to one or more of available DISG torque decreasing, accelerator pedal position rate of change increasing, and accelerator pedal position increasing. Method 400 proceeds to 420 after the driveline disconnect clutch pressure ramp rate is determined.

At 420, method 400 applies the driveline disconnect clutch ramp rate by ramping driveline disconnect working fluid pressure from the start of closing pressure. Thus, driveline disconnect clutch working fluid pressure is ramped via increasing working fluid pressure. The driveline disconnect clutch ramp may be applied by modulating a solenoid valve supplying working fluid to the driveline disconnect clutch. Method 400 proceeds to 422 after the driveline disconnect clutch ramp rate is applied to the driveline disconnect clutch.

At 422, method 400 performs one or more tasks including counting engine combustion events since engine stop, counting time since driveline disconnect clutch pressure started being ramped, and determining engine speed. The tasks may be the basis for stopping driveline disconnect clutch working fluid pressure ramping and reducing driveline disconnect clutch pressure to allow additional slip between the DISG and the engine being started by the DISG. Method 400 proceeds to 424 after starting to counting engine combustion events since engine stop, counting time since driveline disconnect clutch pressure started being ramped, and determining engine speed.

At 424, method 400 judges if the driveline disconnect clutch working fluid pressure ramping (e.g., increasing) is complete. In one example, the working fluid ramping is performed for a predetermined amount of time. After the predetermined amount of time is reached, the ramping is stopped. In another example, the working fluid ramping is performed for a predetermined number of engine combustion events since engine stop. After the predetermined number of combustion events occurs, the ramping is stopped. In still another example, the working fluid ramping is performed until engine speed exceeds a threshold speed. After the engine exceeds the predetermined engine speed, the ramping is stopped. The working fluid ramping helps to ensure that the engine reaches a desired cranking speed even if manufacturing or wear tolerances exist in the driveline clutch actuation system. If method 400 judges that the working fluid ramping is complete, method 400 proceeds to 426. Otherwise, method 400 returns to 422.

At 426, method 400 reduces the driveline disconnect clutch working fluid pressure to allow the engine speed to run up to synchronous speed with the DISG. In one example, the driveline disconnect clutch working fluid pressure is reduced to an empirically determined pressure stored in memory. The pressure may be indexed via working fluid temperature. The working fluid pressure is reduced via modulation position of a valve that supplies fluid to the driveline disconnect clutch. Method 400 proceeds to 428 after beginning to reduce the driveline disconnect clutch working fluid pressure.

At 428, method 400 holds or ramps the driveline disconnect clutch working pressure ramp rate after reducing the driveline disconnect working pressure at 426. The driveline disconnect clutch working fluid ramp may be applied by modulating a solenoid valve supplying working fluid to the driveline disconnect clutch. The driveline disconnect clutch working fluid pressure may be ramped at a rate that is based on one or more of rate of accelerator pedal position change, accelerator pedal position, and available DISG torque. In one example, the working fluid ramp rate adjustments are empirically determined and stored in memory indexed by rate of accelerator pedal position change, accelerator pedal position, and available DISG torque. Method 400 proceeds to 430 after the driveline disconnect clutch working fluid pressure ramp rate is applied to the driveline disconnect clutch working fluid.

At 430, method 400 judges if the engine speed is equal to the DISG speed. If method 400 judges that engine speed is within a predetermined speed range of DISG speed, method 400 proceeds to 440. Otherwise, method 400 returns to 428.

At 440, method 400 ramps up driveline disconnect working fluid pressure to lock the driveline disconnect clutch. The driveline disconnect clutch is locked when driveline disconnect clutch input speed matches driveline disconnect clutch output speed. Method 400 proceeds to 442 after the driveline disconnect clutch is closed and locked.

At 442, method 400 judges if a driveline disconnect clutch release request is present. The driveline disconnect clutch may be released in response to vehicle speed, to improve vehicle fuel economy, or other conditions. If method 400 judges that a driveline disconnect release request is present, method 400 proceeds to 444. Otherwise, method 400 returns to 442.

At 444, method 400 releases the driveline disconnect clutch via reducing driveline disconnect clutch working fluid pressure. Working fluid pressure may be reduced via modulating a position of a valve supplying working fluid to the driveline disconnect clutch. Method 400 proceeds to exit after driveline disconnect working fluid pressure is reduce and the driveline disconnect clutch is released.

In this way, closing of a driveline disconnect clutch may be adjusted so that vehicle performance increases when a driver is demanding additional torque and so that driveline NVH may be acceptable when the driver is not demanding additional torque. Further, driveline disconnect clutch closing time may be reduced when available DISG torque is approaching DISG torque capacity so that the engine may be started before the DISG reaches its torque capacity.

Thus, the method of FIG. 4 provides for a driveline method, comprising: increasing driveline disconnect clutch working fluid pressure in response to a rate of change in accelerator pedal position. The method includes where increasing driveline disconnect clutch working fluid pressure provides a start of closing pressure after a driveline disconnect clutch is stroked to a position where driveline disconnect clutch friction elements begin to touch. The method also includes where the start of closing pressure is based on an engine cranking torque. The method further comprises ramping an increase in driveline disconnect clutch working fluid pressure after providing the start of closing pressure. The method includes where a ramp rate of ramping the increase in driveline disconnect clutch working fluid pressure is based on the rate of change in accelerator pedal position. The method also includes where the ramp rate of ramping the increase in driveline disconnect clutch working fluid pressure is further based on accelerator pedal position.

The method of FIG. 4 also provides for a driveline method, comprising: increasing driveline disconnect clutch working fluid pressure in response to an available amount of DISG torque; and decreasing driveline disconnect clutch working fluid pressure after the increasing of driveline disconnect clutch working fluid pressure in response to a number of engine combustion events since engine stop. The method further comprises holding the driveline disconnect clutch working fluid pressure after decreasing the driveline disconnect clutch working fluid pressure while an engine speed increases to a speed of a driveline integrated starter/generator.

In some examples, the method further comprises ramping an increase in the driveline disconnect clutch working fluid pressure after decreasing the driveline disconnect clutch working fluid pressure while an engine speed increases to a speed of a driveline integrated starter/generator. The method includes where a ramp rate of ramping the increase in the driveline disconnect clutch working fluid pressure is based on the rate of change in accelerator pedal position. The method includes where the ramp rate of ramping the increase in the driveline disconnect clutch working fluid pressure is further based on accelerator pedal position. The method includes where the increasing driveline disconnect clutch working fluid pressure is further increased in response to a rate of accelerator pedal position change. The method includes where the increasing of driveline disconnect clutch working fluid pressure is based on an engine start request. The method includes where decreasing driveline disconnect clutch working fluid pressure includes decreasing driveline disconnect clutch working fluid pressure to increase driveline disconnect clutch slip.

As will be appreciated by one of ordinary skill in the art, the methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:
1. A driveline method, comprising:
in response to an engine start request, increasing driveline disconnect clutch working fluid pressure to a start of a closing pressure responsive to an available amount of torque of a driveline integrated starter/generator (DISG), the available amount of torque of the DISG being a maximum DISG torque at a present DISG speed and temperature minus a present DISG output torque; and increasing driveline disconnect clutch working fluid pressure from the start of closing pressure at a first rate in response to a first rate of change of an accelerator pedal, and increasing driveline disconnect clutch working fluid pressure from the start of closing pressure at a second rate in response to a second rate of change of the accelerator pedal.

2. The method of claim 1, further comprising decreasing driveline disconnect clutch working fluid pressure after increasing driveline disconnect clutch working fluid pressure at the first rate or the second rate, and after decreasing the driveline disconnect clutch working fluid pressure, holding the driveline disconnect clutch working fluid pressure while an engine speed increases to a speed of the DISG.

3. The method of claim 2, further comprising ramping an increase in the driveline disconnect clutch working fluid pressure after decreasing the driveline disconnect clutch working fluid pressure.

4. The method of claim 3, where a ramp rate corresponding to the first rate is based on a first rate of change in accelerator pedal position, and where a ramp rate corresponding to the second rate is based on a second rate of change in accelerator pedal position.

5. The method of claim 4, where the ramp rate corresponding to the first rate is further based on the available amount of torque of the DISG, and where the ramp rate corresponding to the second rate is further based on the available amount of torque of the DISG.

6. The method of claim 1, where the increasing driveline disconnect clutch working fluid pressure includes increasing driveline disconnect clutch working fluid pressure in response to accelerator pedal position.

7. The method of claim 1, further comprising increasing driveline disconnect clutch working fluid pressure to a fill pressure before increasing the driveline disconnect working fluid pressure to the start of closing pressure.

8. The method of claim 2, where decreasing driveline disconnect clutch working fluid pressure includes decreasing driveline disconnect clutch working fluid pressure to increase driveline disconnect clutch slip.

9. The method of claim 1, where the start of closing pressure is provided after a driveline disconnect clutch is stroked to a position where driveline disconnect clutch friction elements begin to touch.

10. The method of claim 9, where increasing driveline disconnect clutch working fluid pressure to the start of closing pressure includes increasing the driveline disconnect clutch working fluid pressure based on an engine cranking torque.

11. The method of claim 1, further comprising ramping driveline disconnect clutch working fluid pressure down in response to a driveline disconnect clutch release request.

* * * * *